United States Patent [19]

Athale

[11] Patent Number: 4,986,640

[45] Date of Patent: Jan. 22, 1991

[54] HIGH ACCURACY DIGITAL ACOUSTO-OPTIC MATRIX COMPUTER

[75] Inventor: Ravindra A. Athale, Annandale, Va.

[73] Assignee: The United States of America as represented by the Secretary of the Navy, Washington, D.C.

[21] Appl. No.: 704,454

[22] Filed: Feb. 22, 1985

[51] Int. Cl.[5] .......................... G02F 1/11; G06E 3/00

[52] U.S. Cl. .................................... 350/358; 364/713; 364/841; 364/822

[58] Field of Search ................ 350/358, 350; 364/821, 364/822, 841, 713, 845, 819

[56] References Cited

U.S. PATENT DOCUMENTS

| | | | |
|---|---|---|---|
| 3,111,666 | 11/1963 | Wilmotte | 350/358 |
| 3,305,669 | 2/1967 | Fan | 364/845 |
| 4,592,621 | 6/1986 | Amano et al. | 350/358 |
| 4,686,646 | 8/1987 | Goutzoulis | 364/841 X |

FOREIGN PATENT DOCUMENTS

| | | | |
|---|---|---|---|
| 470823 | 5/1975 | U.S.S.R. | 364/841 |

OTHER PUBLICATIONS

Caulfield, H. J., et al., "Optical Implementation of Systolic Array Processing", *Optics Communications*, vol. 40, No. 2, Dec. 15, 1981, pp. 86–90.

Athale, R. A., et al., "High Accuracy Matrix Multiplication with Outer Product Optical Processor", *Applied Optics*, vol. 22, No. 3, Feb. 83, pp. 368–370.

Guilfoyle, P. S., "Systolic Acousto-Optic Binary Convolver," *Optical Engineering*, vol. 23, No. 1, Jan./Feb. 84, pp. 20–25.

Athale, R., "Optical Matrix Algebraic Processors: A Survey," *Proceedings of the 10th International Optical Computing Conference*, pp. 24–31, IEEE Cat. No. 83CH1880–4.

Psaltis, D. et al, "Accurate Numerical Computation by Optical Convolution", SPIE vol. 232, 1980, *International Optical Computing Conference* (1980), pp. 151-156.

Guilfoyle, "Systolic Acousto-Optic Binary Computer (SAOBiC)", Intra paper of GuilTech Research Company, Inc., P.O. Box 61563, Sunnyvale, Calif. 94088.

*Primary Examiner*—Bruce Y. Arnold
*Assistant Examiner*—David R. Parsons
*Attorney, Agent, or Firm*—Thomas E. McDonnell; George Jameson

[57] ABSTRACT

A digital acousto-optic device for performing vector-matrix multiplication. The device comprises two multi-transducer acousto-optic cells imaged onto each other. The first cell receives the elements of the input vector in parallel. The second cell receives the elements of sequential row vectors of the matrix in parallel. The data in the two cells act to modulate a light beam passing therethrough. The modulated light beam is detected to produce an output data stream containing the elements of the output vector. The invention uses binary coded data for high accuracy (~16-bits).

19 Claims, 2 Drawing Sheets

HIGH ACCURACY DIGITAL ACOUSTO-OPTIC MATRIX COMPUTER

BACKGROUND OF THE INVENTION

The present invention relates to acousto-optic systems for performing basic operations of vector-matrix multiplication with digital (16-bit) accuracy. More specifically the present invention relates to an acousto-optic system comprised of two multi-transducer Bragg cells that can perform at least $10^8$ operation/sec of basic vector-matrix multiplication with digital (16-bit) accuracy and which is simple and compact.

Optical processors have the advantages of (a) inherent parallelism of data propagation; (b) ease of performing analog multiplication and additions, and (c) the use of a third spatial dimension to achieve global interconnections between different elements of an array. One generally useful class of operations which inherently require these three properties is that of matrix operations—e.g. vector-matrix and matrix-matrix multiplication. A review of different architectures for optical matrix processors can be found in the literature (R. A. Athale, "Optical Matrix Algebraic Processors: A Review," Proceedings of the 10th International Optical Computing Conference, p. 24, IEEE Catalog No. 83 CH 1880-4). Optical computing is however largely analog. Recently several papers presented ways to improve the accuracy by digital encoding of data—especially as configured for a matrix processor (R. A. Athale, W. C. Collins, P. D. Stilwell, Appl. Opt, Vol. 22, p. 368, 1983; P. S. Guilfoyle, Optical Eng., Vol. 23, p. 20, 1984). In addition to these architecture developments, recently the technology for manufacturing large bandwidth (~100 MHz), high performance, multichannel acousto-optic devices for rapid input of data into optical processors has matured considerably ("Acoustooptic Signal Processing Theory and Applications," N. J. Berg and J. N. Lee, eds. Marcel-Dekker Pub., New York, 1983). The wide variety of architectures that are possible with optical systems allow for the desired input/output interfacing to be achieved.

The basic operation chosen for the present optical system architecture is the multiplication of two vectors to produce a scalar (inner or dot product). The vector-matrix multiplication between an N element column vector and an MxN matrix can be accomplished in M steps as successive inner products between the input vector and columns of the matrix $$Ab = c;\ c_i = \sum_{j=1}^{N} A_{ij}b_j \qquad (1)$$

A matrix-matrix multiplication can be accomplished in $N^2$ steps by a straight forward extension. For higher accuracy the algorithm used will be digital multiplication by analog convolution first proposed by Whitehouse and Speiser (H. J. Whitehouse and J. M. Speiser in "Aspects of Signal Processing with Emphasis on Under Water Acoustics," Vol. 2, Reidel Pub., Boston, 1976, p. 669–702) and first demonstrated optically by D. Psaltis et al. (D. Psaltis, et al., proc. of SPIE, Vol. 232, p. 160–167, 1980). This principle was combined with the optical systolic architecture for vector-matrix multiplier (H. J. Caulfield, W. T. Rhode, M. J. Foster and S. Horvitz, "Optical Implementation of Systolic Array Processing," *Optics Communications*, Vol. 40, No. 2, 15 December 1981, pp. 86–90 as well as optical engagement architecture in a paper by P. S. Guilfoyle referred to earlier. The proposed system in this paper has several drawbacks, however. It requires acousto-optical devices with two different materials. The acoustic velocity ratios are not easily adjustable, and therefore the accuracy of the system which is largely determined by those ratio's is difficult to adjust. The optical components required to image two Bragg cells, the commonly used acousto-optic device in the above-identified systems, on each other require a rather large anamorphism (~16) thus making it complicated. The output interface requires a linear array of N high speed detectors and each detector requires an analog/digital converter and a digital shift-and-add circuit to decode the output, making it very expensive. The output vector is calculated after $(3N-1)$ steps of the processor.

SUMMARY OF THE INVENTION

Accordingly, one object of this invention is to provide a novel acousto-optical system that performs at least $10^8$ multiplications per second with 16-bit digital accuracy that is compact and simple.

Another object of the present invention is to provide a novel acousto-optical system that performs at least $10^8$ multiplications per second with 16-bit digital accuracy, that is compact and simple and that utilizes two acousto-optical cells of the same material for greater accuracy and easier adjustment.

Another object of the present invention is to provide a novel acousto-optical system that performs at least $10^8$ multiplications per second with 16-bit digital accuracy that is compact and simple and requires only simple optical components to image the two acousto-optical cells of the system on each other.

Another object of the present invention is to provide a novel acousto-optical system that performs at least $10^8$ multiplications per second with 16-bit digital accuracy that is compact and simple and that requires only one detector, one analog-digital converter and one digital shift and add circuit to decode the output.

Another object of the present invention is to provide a novel acousto-optical system that performs at least $10^8$ multiplications per second with 16-bit digital accuracy that is compact and simple and that has a time bandwidth product of $(2B-1)$, where B is the number of bits required to represent the input vector and matrix elements.

Another object of the present invention is to provide a novel high-speed acousto-optical system that utilizes two multi-transducer Bragg cells imaged onto each other and in parallel so that data fed into the Bragg cells acts to modulate light passing therethrough.

These and other objects are realized by an apparatus for performing at least $10^8$ multiplications per second with 16-bit digital accuracy comprising: a first multichannel acousto-optic device which receives impulses representing a matrix (MxN) through its channels in a first acoustic propagation direction; means for generating light which illuminates the first acousto-optic device; a second multichannel acousto-optic device which receives impulses representing a vector (Nxl) through its channels in an acoustic propagation direction opposite to the first acoustic propagation direction; said second acousto-optic device being of the same type as the first acousto-optic device, the second acousto-optic device aligned parallel to and imaged at a 1:1 correspondence on the first acousto-optic device so that any light passing through the first acousto-optic device from the light means will strike the second acousto-optic device; an imaging optic means; a focusing lens; and a photodetector.

Additional embodiments include an analog to digital converter that receives input from the photodetector, a shift register that receives input from the converter and an accumulator that receives input from the shift register.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
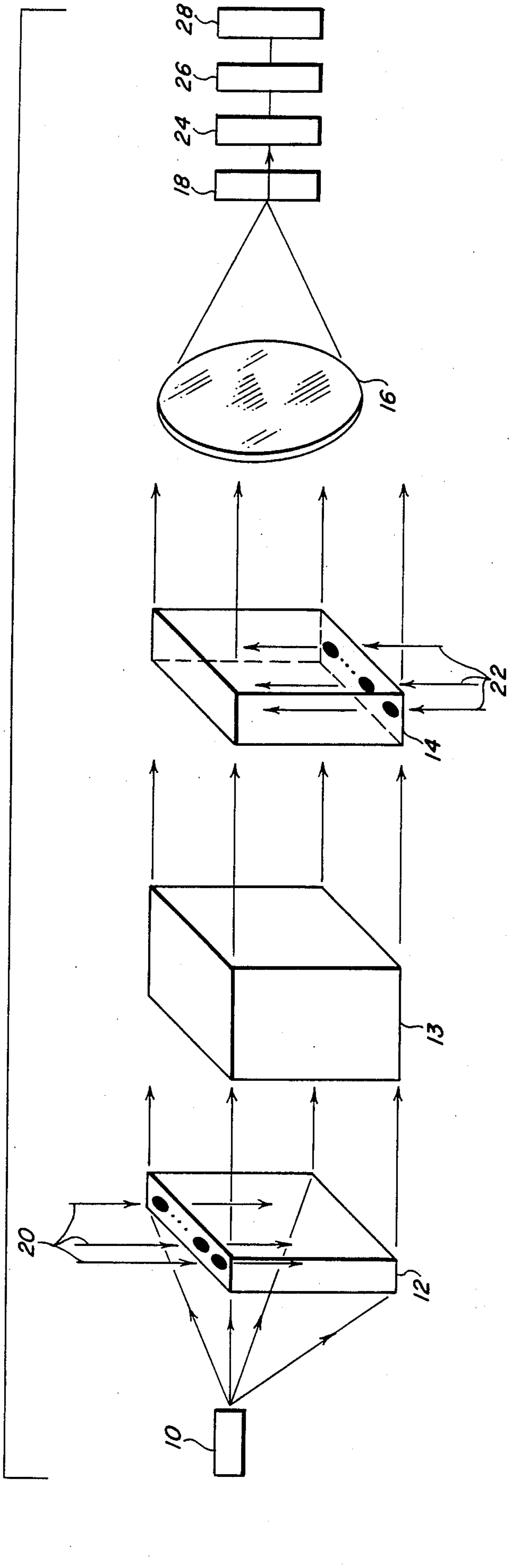
FIG. 1 is a schematic diagram of the high accuracy digital acousto-optics matrix computer.

Referring now to the drawings, wherein like reference numerals designate identical or corresponding parts throughout the several views, and more particularly to FIG. 1 thereof, a light source 10 illuminates the face of a multitransducer acousto-optic cell 12 (the number of transducers is determined by the number of elements of the vector and matrix, which must be identical, and the propagation length of the acousto-optic cell must be at least large enough to hold the longest binary word of an element in it along one column at a given moment). A second multitransducer acousto-optic cell 14 is alongside and parallel to cell 12. Acousto-optic cell 14 is identical to acousto-optic cell 12 except that the acoustic propagation direction is opposite resulting in an acoustic wave propagating in opposite directions in these two cells (counter propagation). These two cells are imaged on each other with a simple 1:1 imaging system 13 (no demagnification required) and aligned so the transducers of the two cells are aligned. The imaging system can simply be a lens. The light from the light source 10 that passes through the cell 12 is focused by a lens 16 onto a single high speed photodetector 18 after the light is modulated by cell 14 positioned one focal length away from the lens 16.

Figure 2:
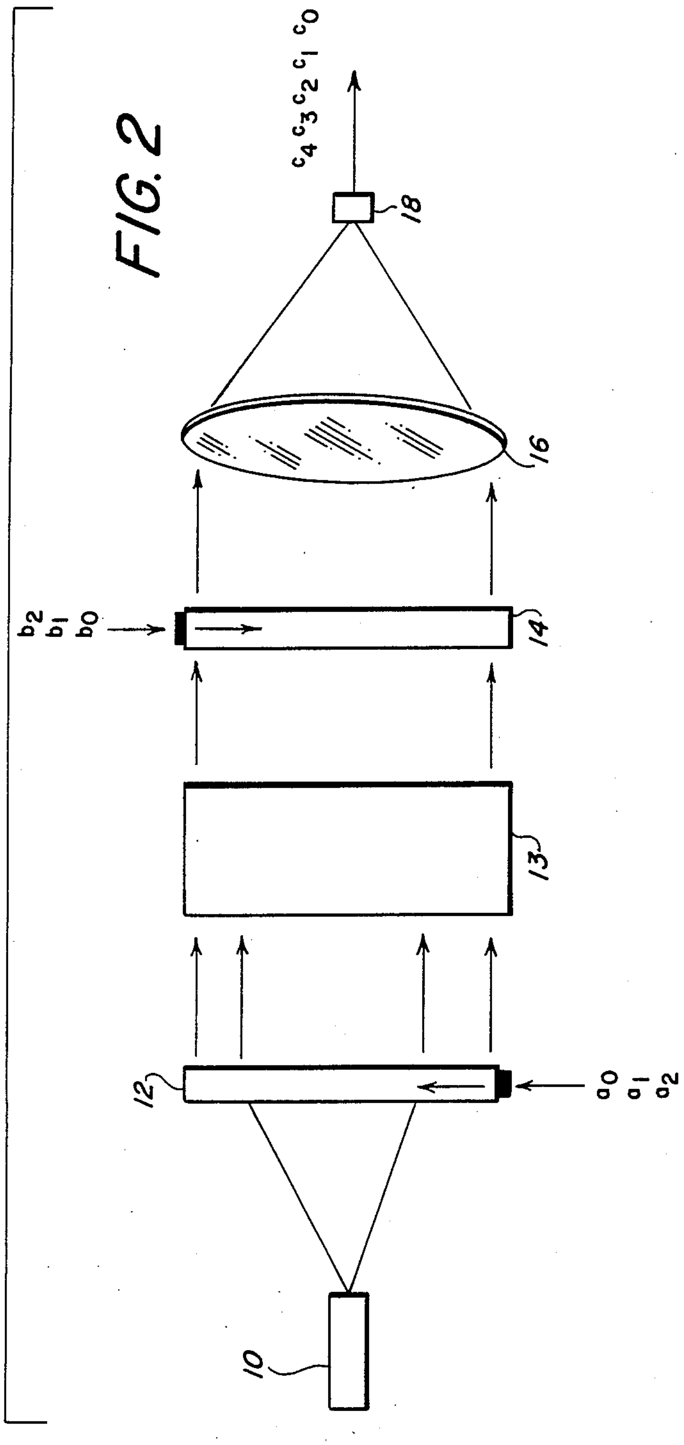
FIG. 2 is a schematic diagram showing multiplication of two numbers by an acousto-optic convolver.

The acoustic cell 12 receives N elements of the input column vector in parallel through the N transducers 20. Each element is input in a bit-sequential fashion with a zero (gap) inserted between the bits. The second cell receives the N-elements of a row vector of A in parallel through the N transducers 22 with each element applied in a bit serial fashion as shown in FIG. 2. The second cell 14 receives all the rows of A in a sequential fashion, while the first cell 12 receives the same b vector (N x 1) data over and over. The data streams in the two cells are synchronized with respect to each other. The detector 18 output stream contains the elements of the output vector c ($M \times 1$) that are sequential with respect to bits as well as to index. Each channel in these cells is required to have a time bandwidth product of ($2B-1$), where B is the number of bits required to represent the input vector and matrix elements. (It does not matter whether the first cell or the second cell receives the vector or the matrix as long as it is consistent).

The detector 18 output stream is subsequently processed by an analog to digital convertor 24 and then by a shift register 26 and an accumulator/adder 28.

Briefly, when an element inputted through a transducer is nonzero (one) the localized area around an inputted pulse in the Bragg cell undergoes an index of refraction change allowing light from the laser to be deflected through the Bragg cell. If the second Bragg cell also has a nonzero pulse inputted at the respective corresponding parallel prints to the first Bragg cell, then light will also be deflected through the second Bragg cell. The photodetector 18 is disposed such that it will only receive the doubly deflected light (the undeflected light can be stopped by an absorbing baffle-not shown in FIG. 1). This simple optical system effectively performs a binary multiplication between different bits of a vector element and different bits of the corresponding matrix element in parallel. This procedure thus simulates actual vector multiplication, since there is a non zero product only when two vectors share at least one dimension corresponding non zero dimension that is the same. Additionally, in vector multiplication, the final product is determined by adding all the individual elemental products. Here all the individual elemental products of the same binary significance are calculated at the same time, according to the inputs of the various transducers in the 2 Bragg cells, so the intensity of the light reaching the photodetector has the information proportional to the mixed binary bit of the same significance of actual sum. Other mixed binary bits of the sum are subsequently calculated and stored. It should be remembered that the vector multiplication in the two Bragg cells is binary vector multiplication but the result collected by the photodetector is binary weighted. The part of the system in operation subsequent to the photodetector converts the binary weighted output to ordinary binary numbers.

The operation of the device will further be explained with the help of the following steps:

(i) Multiplication of binary numbers by analog convolution.

(ii) Addition of binary numbers without carry propagation.

(iii) Inner product of two binary encoded vectors via multiple simultaneous convolutions and summations without carries.

(iv) Vector-Matrix multiplication via several inner products.

(i) MULTIPLICATION OF BINARY NUMBERS BY CONVOLUTION

This procedure can be explained with the help of an example. Two numbers to be multiplied are 6 and 3, which are represented by 3-bit binary numbers 110 and 011 respectively. The answer is 18 which can be represented as a 5-bit binary word 10010. Ordinarily the binary multiplication is carried out by forming partial products between the two numbers and then adding shifted partial products as illustrated below:

110 = 6
× 011 = × 3
110
1100
00000

-continued

| | | |
|---|---|---|
| 10010 | = | 18 |

The similarity between this operation and a convolution operation suggests that this binary multiplication can be carried out by a convolution operation. The convolution of two sequences a2a1a0 and b2b (where the arrows point the direction the sequences are moving) is shown below:

$$\begin{array}{cccc} & a_2 & a_1 & a_0 \rightarrow \\ \leftarrow & b_0 & b_1 & b_2 \end{array}$$

resulting in $c_0\ c_1\ c_2\ c\ _3\ c_4$ where $c_0 = a_0b_0$ $c_1 = a_0b_1 + a_1b_0$ $c_2 = a_0b_2 + a_1b_1 + a_2b_0$ $c_3 = a_1b_2 + a_2b_1$ $c_4 = a_2b_2$ Now if we substitute $a_2a_1a_0 = 110$ and $b_2b_1b_0 = 011$, then $c_4c_3c_2c_0 = 0\ 1\ 2\ 1\ 0$. This represents the final answer in a mixed binary form from the photodector 18 in which the weights associated with each digit are still successive powers of two, but the bits themselves can be greater than 1. To convert the mixed binary number into conventional binary number, each digit is converted into a binary representation using an Analog-to-Digital(A/D) converter and the binary words of the mixed digits are added after being shifted with respect to each other. In the current example, each digit is represented by two bits. This operation is shown below:

| | | | |
|---|---|---|---|
| $c_0$ | 00 | | |
| $c_1$ | 01 | + | |
| $c_2$ | 10 | + | |
| $c_3$ | 01 | + | |
| $c_4$ | 00 | + | |
| | 010010 | = | 18 |

The convolution operation can be implemented using two acousto-optic devices 12 and 14, one light source 10, an imaging system 13, a focusing lens 16 and a photodetector array 18 arranged as shown in FIG. 2. The detector is followed by an A/D converter 22, a shift register 24 and an accumulator 26 to convert the mixed binary digits resulting from the acousto-optic convolver. The two binary numbers are fed to the two acousto-optic cells synchronously but in the opposite direction. As the two binary sequences move past each other, the light deflected by both of them contain a multiplication between bits of the shifted sequences. The lens performs addition by collecting all the light on a detector. The mixed binary digits are thus generated serially ($c_0$, $c_1$, $c_2$, etc...).

(ii) ADDITION OF BINARY NUMBERS WITHOUT CARRY PROPAGATION

In conventional binary addition, summation of two bits of the same significance from different numbers to be added generate a sum bit of the same significance and a carry bit of higher significance. The carry bit is then inputted to the next significant bit addition. This is illustrated by addition of two numbers 3=011 and 2=010.

| | | |
|---|---|---|
| 011 | | 3 |
| + 010 | | + 2 |
| 1 | Carry bit | |
| 101 | Sum bit | 5 |

The carry bit can be avoided by using mixed binary representation. Now the addition of all bits can be carried out in parallel.

| |
|---|
| 011 |
| + 010 |
| 021 |

The answer can be converted to a conventional binary representation using a procedure similar to that described for binary multiplication by analog convolution.

Figure 3:
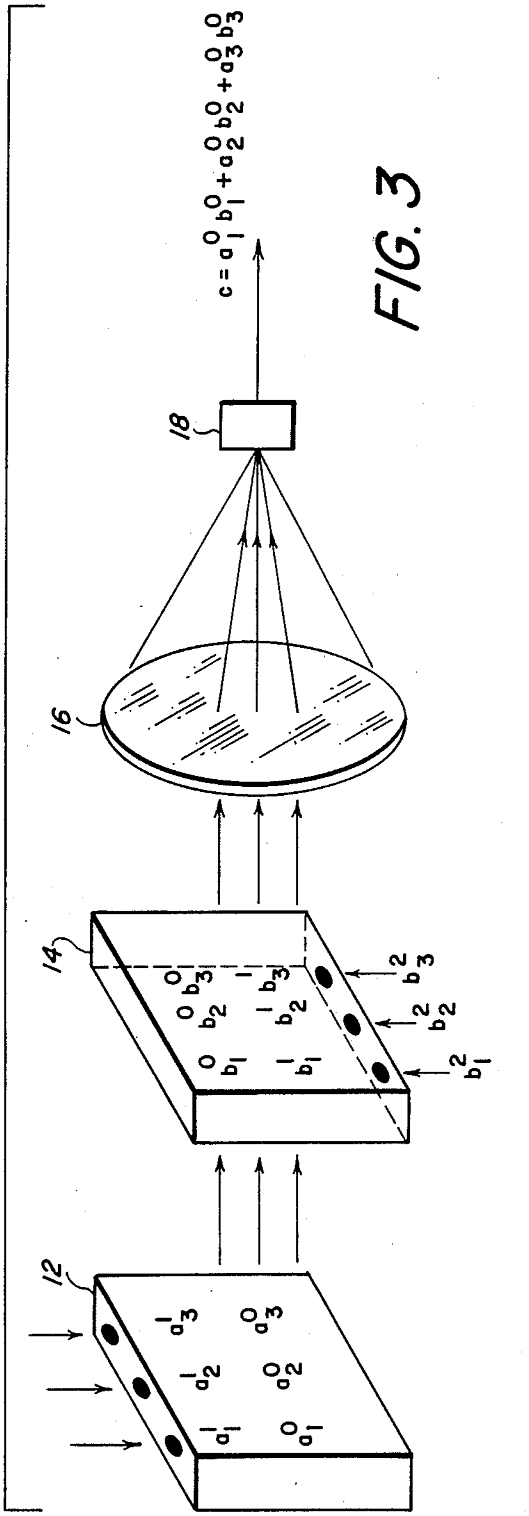
FIG. 3 is a schematic diagram of the data configuration shown at clock cycle 1 in an acousto-optic computer.

(iii) INNER PRODUCT OF TWO BINARY ENCODED VECTORS VIA MULTIPLE SIMULTANEOUS CONVOLUTIONS AND SUMMATIONS WITHOUT CARRIES The inner product (or dot product) of two three-element vectors a ($a = a_1a_2a_3$) and b ($b = b_1b$ is defined as $c = a \cdot b = a_1b_1 + a_2b_2 + a_3b_3$ and therefore involves summation of products of corresponding elements of the input vectors. If the vector elements are represented as binary words then each of these products can be performed via an acousto-optic convolver. The summation of the products can also be accomplished one mixed binary digit at a time (i.e. without carries) if these convolvers are synchronized such that the results of the multiplications are generated in a bit-synchronous fashion. FIG. 3 shows the expanded view of the two multichannel acousto-optic cells (12 and 14 in FIG. 1) and the lens (16) along with the data streams. In this example each vector element is digitized to 3-bits.

TABLE I

| CLOCK CYCLE | CHANNEL 1 | | CHANNEL 2 | | CHANNEL 3 | | OUTPUT |
|---|---|---|---|---|---|---|---|
| 1 | $a_1^0b_1^0$ | + | $a_2^0b_2^0$ | + | $a_3^0b_3^0$ | = | $C^0$ |
| 2 | $a_1^1b_1^0 + a_1^0b_1^1$ | + | $a_2^1b_2^0 + a_2^0b_2^1$ | + | $a_3^1b_3^0 + a_3^0b_3^1$ | = | $C^1$ |
| 3 | $a_1^2b_1^0 + a_1^1b_1^1 + a_1^0b_1$ | + | $a_2^2b_2^0 + a_2^1b_2^1 + a_2^0b_2$ | + | $a_3^2b_3^0 + a_3^1b_3^1 + a_3^0b_3$ | = | $C^2$ |

Table I shows the contents of the three convolver channels and the detector output for first three clock cycles of the processor where the superscript indicates bit significance and subscript indicates vector index.

Similarly during clock cycles 4 and 5, $c^3$ and $c^4$ will be calculated, thus accomplishing 3-element vector inner product to 5-bit accuracy in 5-clock cycles.

(iv) VECTOR-MATRIX MULTIPLICATION VIA SEVERAL INNER PRODUCTS

The multiplication of an N-element vector by an M×N matrix A is defined below:

$$Ab = c$$

$$C_i = \sum_{j=1}^{N} A_{ij} b_j$$

$$\begin{bmatrix} c_1 \\ c_2 \\ \cdot \\ \cdot \\ \cdot \\ c \end{bmatrix} = \begin{bmatrix} A_1 & A_{12} & \cdots & A_{1N} \\ A_{21} & A_{22} & \cdots & A_{2N} \\ \cdot & \cdot & & \cdot \\ \cdot & \cdot & & \cdot \\ \cdot & \cdot & & \cdot \\ A_{M1} & A_{M2} & \cdots & A_{MN} \end{bmatrix} \begin{bmatrix} b_1 \\ b_2 \\ \cdot \\ \cdot \\ \cdot \\ b_N \end{bmatrix}$$

It can be seen that element $b_1$ of the output vector b is equal to the inner product of the first row of matrix A and the input vector b. Since this inner product can be performed with high accuracy via a multi-channel acousto-optic convolver shown in FIG. 1. The same system can perform the useful operation of vector-matrix multiplication as successive inner products of rows of matrix A and the input vector x without any physical modification of the system.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An apparatus for performing at least $10^8$ operations per second of vector-matrix multiplication with 16-bit digital accuracy comprising:
   - a first multichannel acousto-optic device which receives impulses representing a matrix (M×N) through its channels in a first acoustic propagation direction;
   - means for generating coherent light illuminating the first acousto-optic device;
   - a second multichannel acousto-optic device of the same type as the first acousto-optic device, the second acousto-optic device receiving impulses representing a vector (N×1) through its channels is an acousto-propagation direction opposite to the first acoustic propagation direction; said second acousto-optic device being aligned parallel to and imaged at a 1:1 correspondence on the first acousto-optic device so that any light passing through the first acousto-optic device from the light means will strike the second acousto-optic device, and
   - a single-element high-speed photodetector.

2. An apparatus as described in claim 1 which includes an imaging optics means situated between the first acousto-optic device and the second acousto-optic device to insure that light passing through the first acousto-optic device strikes the second acousto-optic device;
   - and a focusing lens aligned with said second acousto-optic device so that all light passing through the said second acousto-optic device and said first acousto-optic device enters said lens and is focusing onto said photodetector.

3. An apparatus as described in claim 2 which includes an analog to digital converter that receives input from said photodetector.

4. An apparatus as described in claim 3 which includes a shift register that receives input from said converter.

5. An apparatus as described in claim 4 which includes an accumulater that receives input from said shift register.

6. An apparatus as described in claim 10 wherein said lens is positioned one focal length away from said detector.

7. An apparatus as described in claim 1 wherein said first multichannel acousto-optic device is a multitransducer Bragg cell and said second multichannel acousto-optic device is a multitransducer Bragg cell.

8. An apparatus as described in claim 1 wherein said means for generating coherent light is a laser diode.

9. An apparatus as described in claim 1, wherein each channel of said first multichannel acousto-optic device and said second multichannel acousto-optic device has a time-bandwidth product of (2B−1), where B is the number of bits required to represent the input vector and matrix elements.

10. An apparatus for performing at least $10^8$ operations per second vector-matrix multiplication with digital accuracy comprising:
   - a first multichannel acousto-optic device which receives impulses representing a matrix (M×N) through its channels in a first acoustic propagation direction;
   - means for generating coherent light illuminating said first acousto-optic device;
   - a second multichannel acousto-optic device of the same type as said first acousto-optic device, said second acousto-optic device receiving impulsed representing a vector (N×1) through its channels in an acoustic propagation direction opposite to first acoustic propagation direction; said second acousto-optic device being aligned parallel to. and imaged at a 1:1 correspondence on said first acousto-optic device so that any light passing through said first acousto-optic device from said light means will strike said second acousto-optic device; said second acousto-optic device having its acousto-optic device having its acousto-optic propagation direction opposite to said first acousto-optic device;
   - an imaging optics means situated between the first acousto-optic device and the second acousto-optic device to insure that light passing through the first acousto-optic device strikes the second acousto-optic device;
   - a single-element high speed photodetector;
   - a focusing lens aligned with said second acousto-optic device so that all light passing through said second acousto-optic device and said first acousto-optic device enters said lens and is focused into said photodetector;
   - an analog to digital converter that receives input from said photodetector;
   - a shift register that receives input from said converter;
   - and an accumulator that receives its input from said shift register.

11. An apparatus as described in claim 10 wherein said first multichannel acousto-optic device is a multitransducer cell and said second multichannel acousto-optic device is a multitransducer Bragg cell.

12. An apparatus as described in claim 10 wherein said means for generating coherent light is a laser diode.

13. An apparatus as described in claim 10 wherein said lens is positioned one focal length away from said detector.

14. An apparatus as described in claim 10 wherein each channel of said first multichannel acousto-optic device and said second multichannel acousto-optic device has a time-bandwidth product of $(2B-1)$, where B is the number of bits required to represent the input vector and matrix elements.

15. An apparatus for performing at least $10^8$ operations per second of vector matrix multiplication with 16-bit digital accuracy comprising:

a first multichannel multitransducer Bragg cell which receives impulses representing a matrix $(M\times N)$ through its channels in a first acoustic propagation direction;

a laser diode illuminating said first Bragg cell;

a second multichannel multitransducer Bragg cell of the same type as said first Bragg. cell, said second Bragg cell receiving impulses representing a vector $(N\times 1)$ through its channels in an acoustic propagation direction opposite to the first acoustic propagation direction; said second acousto-optic device being aligned parallel to and imaged at a 1:1 correspondence on said first Bragg cell so that any light passing through said first Bragg cell from said light means will strike said second Bragg cell; said second Bragg cell having its acousto-optic propagation direction opposite to said first Bragg cell;

an imaging optics means situated between the first acousto-optic device and the second acousto-optic device to insure that light passing through the first acousto-optic device strikes the second acousto-optic device;

a single-element high-speed photodetector;

a focusing lens aligned with said second Bragg cell so that all light passing through said second Bragg cell and said first Bragg cell enters said lens and is focused onto said photodetector; said photodetector being positioned one focal length away from said lens;

an analog to digital converter that receives input from said photodetector;

a shift register that receives input from said converter;

and an accumulator that receives input from said shift register.

16. An apparatus as described in claim 15 wherein in each channel of said first Bragg cell and second Bragg cell has a time-bandwidth product of $(2B-1)$, where B is the number of bits required to represent the input vector and matrix elements.

17. A method for carrying out vector-matrix multiplication with 16-bit digital accuracy at rate of at least $10^8$ operations per second comprising the steps of:

inputting, in a synchronized and bit-sequential fashion with a zero inserted between the bits, impulses that represent binary numbers of matrices into transducers of a first and second multitransducer Bragg cell whose faces align in parallel with each other and whose images form a 1:1 correspondence; said first and second Bragg cell having their acousto-optic propagation direction being opposite;

illuminating during the inputting step the face of the first Bragg cell not facing the second Bragg cell with a laser diode so that the entire first Bragg cell is illuminated and so that only when an impulse representing a bit, not zero, of a binary number in the first Bragg cell has aligned in the first Bragg cell with an impulse representing a bit, not zero, of a binary number in the second Bragg cell, light from the laser will pass through the first Bragg cells and through the second Bragg cell;

focusing with a lens the laser light that has passed through the first Bragg cell and the second Bragg cell onto a photodetector.

18. A method as deacribed in claim 17 that further includes the steps after the focusing step of changing the analog signal produced by the photodetector into a binary word with an electronic analog to digital converter;

entering the binary word from the analog to digital converter into a shift register; shifting the binary word one bit to the left; and adding the shifted binary words in an accumulator.

19. A method for optically multiplying a multi-element matrix by a multi-element vector quantity, said method comprising the steps of:

modulating a first spatial light modulator with element values simultaneously from a row in the matrix;

directing modulated light from said first spatial light modulator to a second spatial light modulator;

modulating said second spatial light modulator with a modulating signal which is reflective of element values from a column in the vector and which further includes a serial bit-stream corresponding to the binary equivalent of the element value, with a single fixed binary value inserted between each of the binary bits;

two-dimensionally converging the light from the second spatial light modulator;

converting the total converged light into an equivalent electrical signal; and changing the electrical signal into digital form.

* * * * *